United States Patent
Woo et al.

(10) Patent No.: US 7,612,539 B2
(45) Date of Patent: Nov. 3, 2009

(54) BATTERY CHARGER CIRCUITS USING CONSTANT CURRENT/CONSTANT VOLTAGE MODE USING MAINTENANCE OFFSET CURRENTS AND METHODS OF OPERATING THE SAME

(75) Inventors: Lee Won Woo, Gyeonggi-do (KR); Choi Jin Sub, Gyeonggi-do (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 885 days.

(21) Appl. No.: 10/858,612

(22) Filed: Jun. 2, 2004

(65) Prior Publication Data

US 2005/0007075 A1    Jan. 13, 2005

(30) Foreign Application Priority Data

Jun. 19, 2003  (KR) ...................... 10-2003-0039648

(51) Int. Cl.
*H02J 7/04* (2006.01)
(52) U.S. Cl. ...................................... 320/162; 320/148
(58) Field of Classification Search ................. 320/148, 320/152, 162
See application file for complete search history.

(56) References Cited

U.S. PATENT DOCUMENTS

| 4,302,713 | A | | 11/1981 | Cutler et al. |
| 5,637,981 | A | | 6/1997 | Nagai et al. |
| 5,710,506 | A | * | 1/1998 | Broell et al. ................. 320/145 |
| 6,522,118 | B1 | | 2/2003 | Barcelo et al. |

FOREIGN PATENT DOCUMENTS

| DE | 24 55 393 | 5/1976 |
| EP | 0 948 075 | 10/1999 |
| KR | 1997-0013560 | 3/1997 |

OTHER PUBLICATIONS

Office Action for German patent application No. 10 2004 029 482. 8-45 completed on Jun. 28, 2005.
Notice to Submit a Response for Korean Patent Application No. 10-2003-0039648 mailed on Feb. 23, 2005.

* cited by examiner

*Primary Examiner*—Patrick J Assouad
*Assistant Examiner*—Aaron Piggush
(74) *Attorney, Agent, or Firm*—Myers Bigel Sibley & Sajovec, P.A.

(57) ABSTRACT

Battery charging circuits can change from charging a battery in a constant current mode using an amplifier circuit output to control a voltage controlled current source to provide substantially constant current to the battery to charging the battery in a constant voltage mode using the amplifier circuit output to control the voltage controlled current source to provide a varied current to the battery. Related methods are disclosed.

1 Claim, 4 Drawing Sheets

BATTERY CHARGER CIRCUITS USING CONSTANT CURRENT/CONSTANT VOLTAGE MODE USING MAINTENANCE OFFSET CURRENTS AND METHODS OF OPERATING THE SAME

CLAIM FOR PRIORITY

This application claims priority to Korean Patent Application No.: P2003-0039648, filed in the Korean Intellectual Property Office on Jun. 19, 2003, which is incorporated herein by reference.

FIELD OF THE INVENTION

The invention relates generally to the field of electronics, and more particularly, to battery charger circuits and methods of operating the same.

BACKGROUND

It is known to charge certain types of batteries, such as lithium-ion batteries, using an approach that is commonly referred to as constant current/constant voltage charging. Constant current/constant voltage charging typically involves charging a battery by first providing a constant current thereto and later charging the battery by providing a constant voltage.

One of the reasons that the constant current/constant voltage approach is used is that as the charge stored by the battery approaches full capacity, it may be problematic to continue to provide a constant current as the capacity of the battery to absorb current is reduced. For example, if a constant current is provided to the battery past a safe threshold, the battery may be damaged, or alternatively, the charging circuit may be damaged.

One type of constant current/constant voltage battery charger circuit is discussed, for example, in U.S. Pat. No. 6,522,118 to Barcelo, et al. The circuits discussed in Barcelo include a constant current loop and a constant voltage loop connected to a priority circuit which determine which of the two loops to use in charging the battery. For example, FIG. 3 of Barcelo shows a constant current loop with a first amplifier and a first voltage controlled current source coupled to a load resistor. The circuit of FIG. 3 also includes a constant voltage loop with a second amplifier and a second voltage controlled current source coupled to the battery. Both of the loops are connected to the priority circuit, which selects, for example, a lower of the two amplifier voltages to be provided to the voltage controlled current sources.

SUMMARY

Embodiments according to the invention can provide battery charger circuits using maintenance currents and methods of operating battery charging circuits. For example, in some embodiments according to the invention, battery charging circuits can change from charging a battery in a constant current mode using an amplifier circuit output to control a voltage controlled current source to provide substantially constant current to the battery to charging the battery in a constant voltage mode using the amplifier circuit output to control the voltage controlled current source to provide a varied current to the battery.

In some embodiments according to the invention, the battery can be charged in the constant current mode by providing a substantially constant current to the battery. The voltage at the input of the battery can be compared to a predetermined threshold voltage beyond which the constant voltage mode is used to charge the battery. Charging the battery in the constant current mode can be ceased upon determining that the voltage at the input of the battery equals the predetermined threshold voltage whereupon the battery is then charged in the constant voltage mode by providing a varied current to the battery.

DESCRIPTION OF EMBODIMENTS ACCORDING TO THE INVENTION

The invention will now be described more fully with reference to the accompanying drawings, in which embodiments of the invention are shown. This invention may, however, be embodied in many different forms and should not be construed as being limited to the embodiments set forth herein. Rather, these embodiments are provided so that this disclosure will be thorough and complete and will fully convey the concept of the invention to those skilled in the art. Like numbers refer to like elements throughout.

Figure 1:
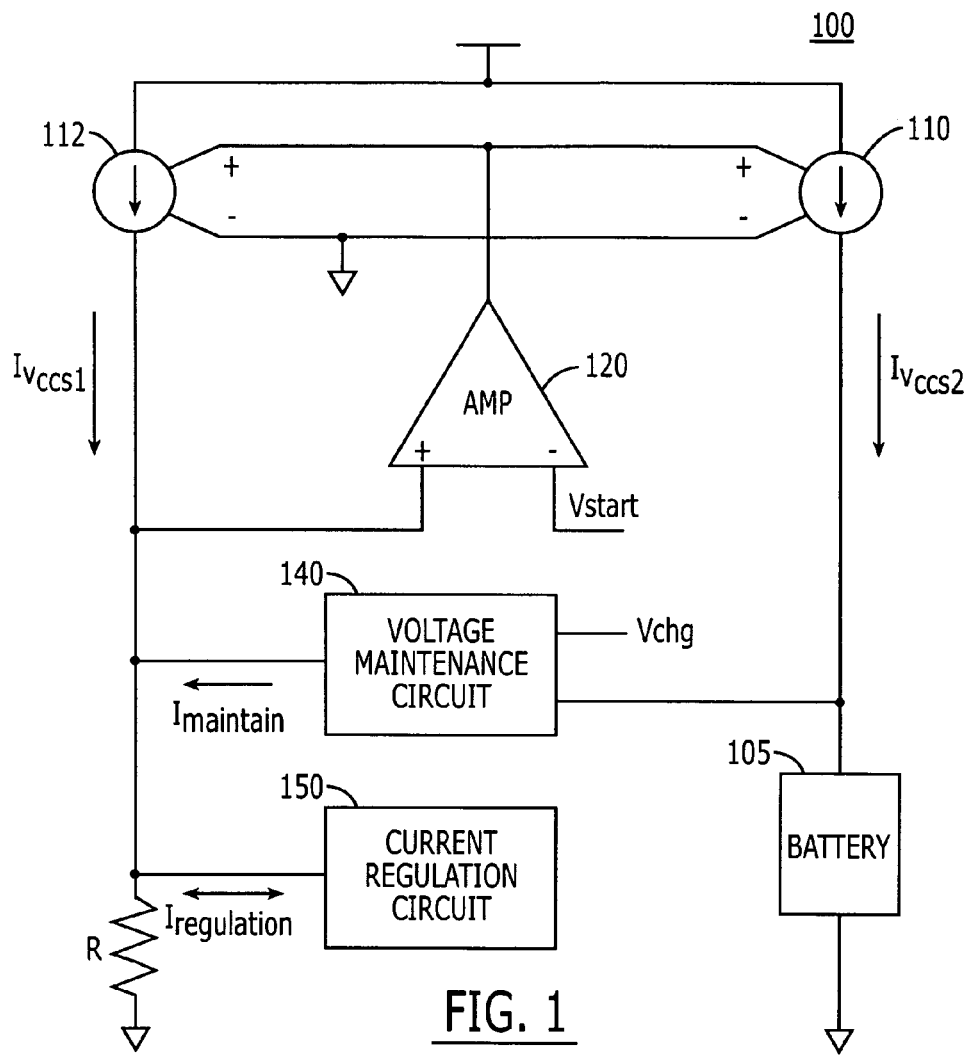
FIG. 1 is a schematic diagram of a constant current/constant voltage battery charging circuit according to some embodiments of the invention.

FIG. 1 is a schematic diagram that illustrates a constant current/constant voltage battery charging circuit 100 according to some embodiments of the invention. In particular, the battery charging circuit 100 includes first and second voltage controlled current sources 112, 110 that generate respective currents $I_{VCCS1}$ and $I_{VCCS2}$ responsive to a voltage applied thereto. As shown in FIG. 1, the first and second current sources 112 and 110 are coupled in parallel to function as current mirrored sources responsive to the applied voltage. In other words, the first and second current sources 112 and 110 each generate substantially equal currents $I_{VCCS1}$ and $I_{VCCS2}$ responsive to the same voltage applied thereto.

Input terminals of an amplifier 120 are electrically coupled to the load R and to a voltage $V_{start}$. In particular, a positive terminal of the amplifier 120 is coupled to an input to the load R whereas a negative terminal of the amplifier 120 is coupled to the predetermined voltage $V_{start}$. In some embodiments according to the invention, the voltage $V_{start}$ corresponds to a voltage source (VDD) that is capable of turning on the amplifier 120. It will be understood that the amplifier may be used in other configurations to provide substantially the same operations described herein. For example, in some embodiments according to the invention, the voltages described above can be applied to the opposite one of the positive and negative terminals. Further, in some embodiments according to the invention, the predetermined voltage $V_{start}$ is applied to the negative terminal and the voltage at the input of the load resistor is applied to the positive terminal.

As shown in FIG. 1, the amplifier 120 is coupled to the first and second voltage controlled current sources 112, 110 so that the amplifier 120 can control the first and second current sources 112, 110 in both the constant current mode and in the constant voltage mode. The currents, $I_{VCCS1}$ and $I_{VCCS2}$ are provided to a load R and to a battery 105 respectively.

The battery charger circuit 100 according to some embodiments of the invention also includes a voltage maintenance circuit 140 coupled between the input to the load R and the input of the battery 105. In operation, the voltage maintenance circuit 140 is configured to monitor the voltage level at the input of the battery 105 compared to a predetermined threshold voltage $V_{CHG}$. In some embodiments according to the invention, the predetermined voltage $V_{CHG}$ represents a voltage level below which the circuit 100 uses constant current mode to charge the battery 105 and beyond which the circuit 100 uses constant voltage mode to charge the battery 100.

If the voltage maintenance circuit 140 detects that the voltage level at the input of the battery 105 is less than the predetermined threshold voltage $V_{CHG}$, the voltage maintenance circuit 140 is held off so that no variable maintenance current is output therefrom. Accordingly, the first current $I_{VCCS1}$ from the source 112 is provided to the load R, which corresponds to the constant current mode of charging the battery 105 using the current output from the source 110. During the constant current mode of charging, the voltage of the battery 105 may rise.

When the voltage maintenance circuit 140 detects that the voltage level at the input of the battery 105 has increased to be about equal to the predetermined threshold voltage $V_{CHG}$, the voltage maintenance circuit 140 begins generating a variable maintenance current $I_{MAINTAIN}$, which is provided to the load R in addition to the first current $I_{VCCS1}$, which in-turn causes the first current $I_{VCCS1}$ from the source 112 to be simultaneously reduced so that the total current to the load R is held constant. Moreover, as the first current $I_{VCCS1}$ from the source 112 is reduced, the second current $I_{VCCS2}$ from the source 110 is correspondingly reduced, which indicates a switch from the contrast current mode of charging (described above) to a contrast voltage mode of charging the battery 105.

In the constant voltage mode of operation, the current provided to the battery 105 is varied whereas the voltage provided to the input of the battery 105 is held substantially constant. For example, as described above, the battery charger circuit 100 may initiate operations in constant current mode so that the current provided to the input of the battery 105 is substantially constant. However, as the voltage level at the input of the battery 105 increases to equal the predetermined threshold voltage $V_{CHG}$, the battery charger circuit 100 begins to operate in (i.e., switches to) the constant voltage mode. In constant voltage mode, the current $I_{VCCS2}$ provided to the battery 105 can vary while the voltage applied to the input of the battery 105 can remain substantially constant.

As the voltage of the battery 105 continues to increase relative to the predetermined threshold voltage $V_{CHG}$, the current maintenance circuit 140 increases the variable maintenance current to the load R. As the variable maintenance current increases, the current $I_{VCCS1}$ provided by the first voltage controlled current source 112 decreases so that the total current through the load R ($I_{MAINTAIN}+I_{VCCS1}$) remains substantially constant during the constant voltage mode. Because the first and second voltage controlled current sources 112, 110 are coupled together in a current mirror configuration, the second voltage controlled current source reduces $I_{VCCS2}$ as $I_{VCCS1}$ is decreased. Therefore, in constant voltage mode the current provided to the battery 105 by the second voltage controlled current source 110 can vary while the voltage applied to the battery is held substantially constant.

As shown in FIG. 1, the battery charger circuit 100 according to some embodiments of the invention also includes a current regulation circuit 150 that can operate to provide minor adjustments to the total current provided to the load R. Accordingly, the amplifier output 120 is used to control the first and second current sources 112, 110 to provide the substantially constant current in the constant current mode and to provide the varied current during the constant voltage mode.

Figure 2:
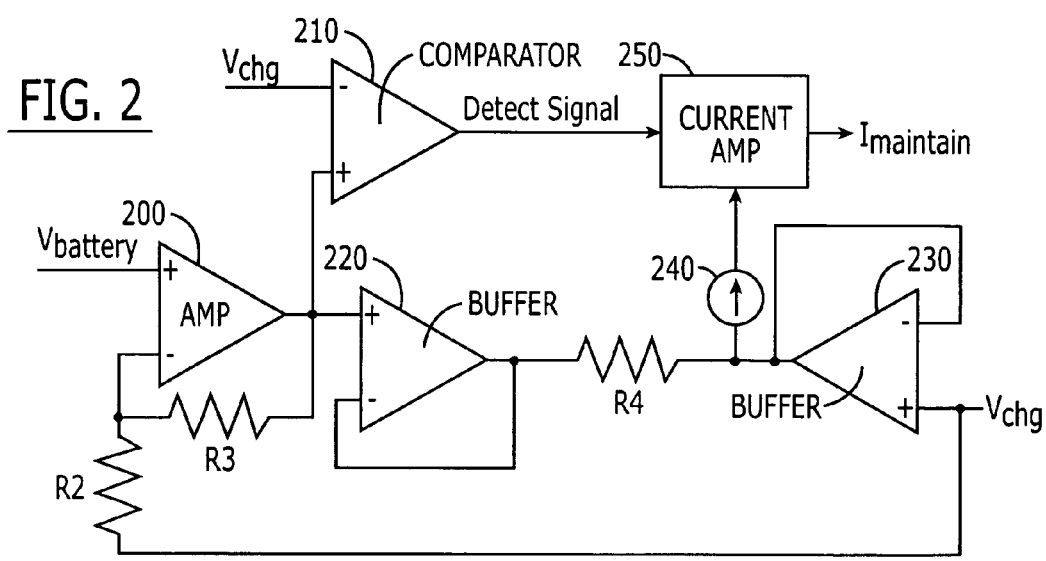
FIG. 2 is a schematic diagram of a voltage maintenance circuit according to some embodiments of the invention.

FIG. 2 is a schematic diagram that illustrates a voltage maintenance circuit shown in FIG. 1 according to some embodiments of the invention. As shown in FIG. 2, the voltage maintenance circuit 140 includes a voltage level detector stage having an amplifier 200 that monitors the voltage at the input of the battery 105. The amplifier 200 amplifies the voltage detected at the input of the battery 105 according to a negative feedback loop including resistors R3 and R2.

It will be understood that the negative feedback can effectively remove an offset that may otherwise be included in the voltage at the input of the battery 105. The voltage level detector stage also includes a comparator 210 that compares the output of the amplifier 200 to the predetermined threshold voltage $V_{CHG}$. As discussed above, when the voltage at the input of the battery 105 (having any offset removed) is detected to exceed the predetermined threshold voltage $V_{CHG}$, the comparator indicates that the mode used to charge the battery should be changed from constant current mode to constant voltage mode by generating a corresponding signal shown in FIG. 2.

The voltage maintenance circuit 140 also includes a buffer 220 that can operate to provide a stabilized version of the output from the amplifier 200 (i.e., the amplified voltage detected at the input of the battery 105 having the offset removed). The stabilized output from the amplifier 200 is provided to a first terminal of a load R4. A second terminal of the load R4 is coupled to a buffer 230 that provides a stabilized version of the predetermined threshold voltage $V_{CHG}$ to the load R4. When the voltage at the input of the battery 105 is less than the predetermined threshold voltage $V_{CHG}$, current flows through the load R4 in the direction of the buffer 220. However, when the voltage at the input of the battery 105 is greater than the predetermined threshold voltage $V_{CHG}$, current flows through the load R4 in the direction of the buffer 230. When the current flows through the load R4 in the direction of the buffer 230, a current source 240 provides a preliminary version of the variable maintenance current to a current amplifier 250. The current source 240 provides the preliminary variable maintenance current based on the difference between the voltage at the input of the battery 105 and the predetermined threshold voltage $V_{CHG}$.

The preliminary version of the variable maintenance current is provided to the current amplifier 250, which is enabled by the signal from the comparator 210 indicating that the battery charger circuit is operating in constant voltage mode. Accordingly, when the battery charger circuit 100 is operating in the constant voltage mode, the preliminary variable maintenance current is amplified by the current amplifier 250 to provide the variable maintenance current described above in reference to FIG. 1.

Figure 3:
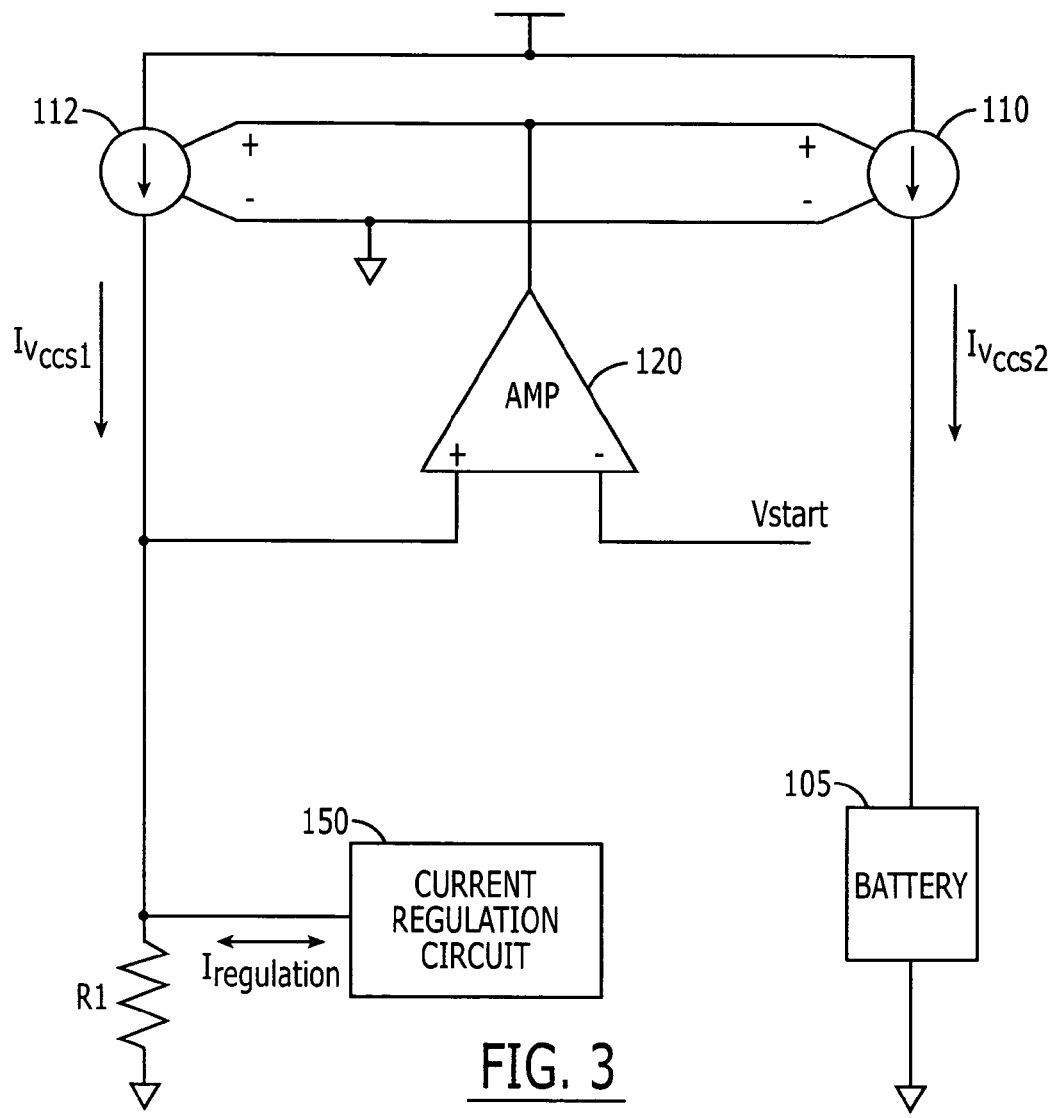
FIG. 3 is a schematic diagram of the battery charging circuit shown in FIG. 1 operating in constant current mode according to some embodiments of the invention.

FIG. 3 is a schematic diagram that illustrates operations of the battery charger circuit 100 shown in FIG. 1 in constant current mode according to some embodiments of the invention. In particular, when the battery charger circuit 100 operates in constant current mode, the output of the amplifier 230 shown in FIG. 2 is greater than the output of the buffer 220

(i.e., reflecting that the voltage at the input of the battery 105 is less than the predetermined threshold voltage $V_{CHG}$). Accordingly, the preliminary variable maintenance current produced by the current source 240 is substantially 0.0. Moreover, the comparator 210 indicates that the battery charger circuit 100 is currently operating in constant current mode thereby disabling the current amplifier 250 which holds the variable maintenance current at about 0.0 amps. As shown in FIG. 3, the only current components provided to the load R in the constant current mode are those currents provided by the first voltage controlled current source 112 and any regulation current provided by the current regulation circuit 150. Accordingly, the current provided to the battery 105 during the constant current mode is generated by the second voltage controlled current source 110 due to the current mirror configuration with the first voltage controlled current source 112.

Figure 4:
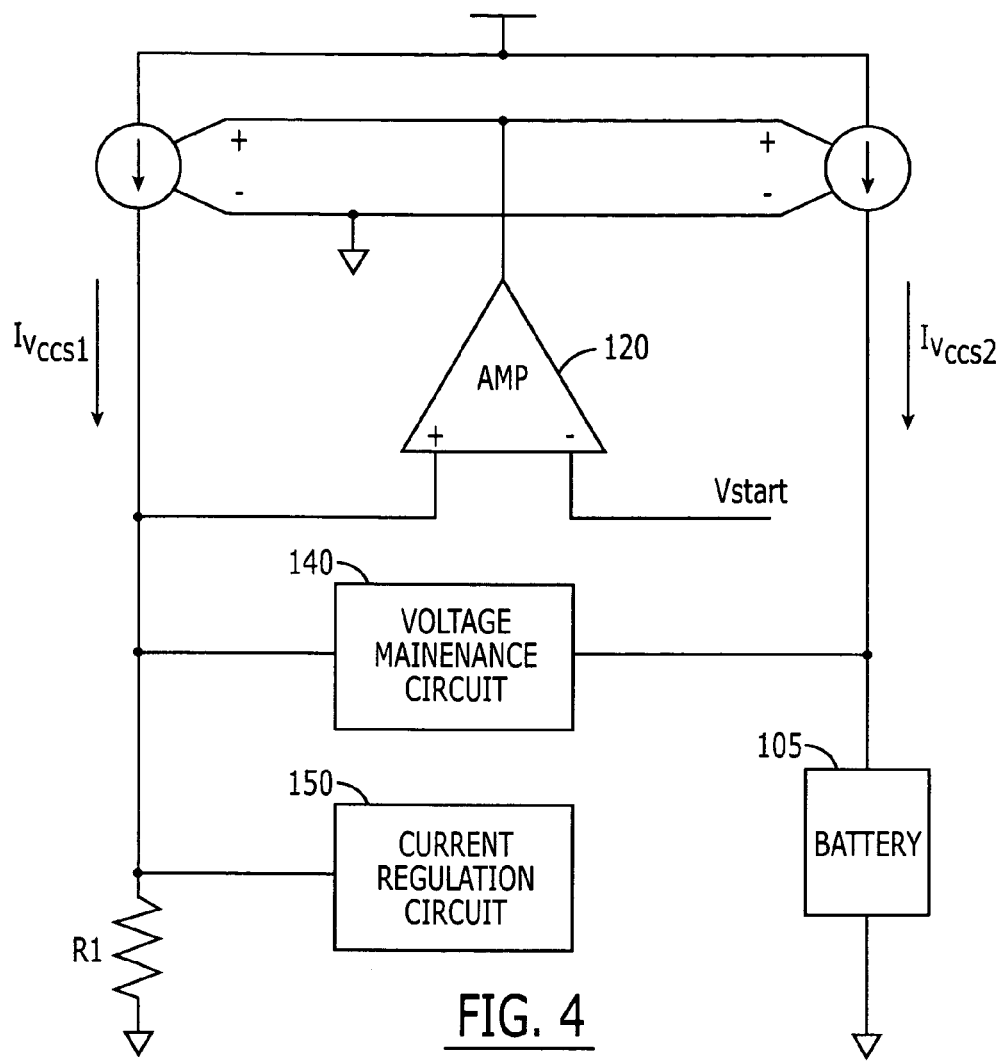
FIG. 4 is a schematic diagram of the battery charging circuit shown in FIG. 1 operating in constant voltage mode according to some embodiments of the invention.

FIG. 4 is a schematic diagram that illustrates the operation of the battery charger circuit 100 shown in FIG. 1 in constant voltage mode according to some embodiments of the invention. In particular, as the voltage maintenance circuit 140 detects that the input voltage of the battery 105 becomes equal to the predetermined threshold voltage $V_{CHG}$, the constant voltage mode enabling signal is provided to the current amplifier 250 shown in FIG. 2. Furthermore, the outputs of the buffer 220 and the amplifier 230 provide the biasing across the load R4 so that the preliminary variable maintenance current is generated by the current source 240 and provided to the current amplifier 250 which, in turn, generates the variable maintenance current that is provided to the load R in FIG. 4. The addition of the variable maintenance current provided by the offset current circuit 140 causes the current $I_{VCCS1}$ provided by the first voltage controlled current source 112 to be reduced so that the total current provided to the load R1 is held substantially constant. Furthermore, as the current $I_{VCCS1}$ is reduced so is the current $I_{VCCS2}$ generated by the second voltage controlled current source 110 due to the current mirror configuration.

As the battery 105 continues to charge in the constant voltage mode, the voltage measured at the input to the battery 105 continues to increase, which further increases the difference between the battery voltage and the predetermined threshold voltage $V_{CHG}$ detected by the level detector stage in the voltage maintenance circuit 140. As the difference increases, so does the variable maintenance current provided to the load R. As the variable maintenance current continues to increase, the current $I_{VCCS1}$ provided by the first voltage controlled current source 112 continues to decrease so that the total current provided to the load R continues to be held substantially constant. Moreover, as the current $I_{VCCS1}$ provided by the first voltage controlled current source 112 continues to decrease, so does the current $I_{VCCS2}$ provided by the second voltage controlled current source 110. Furthermore, an additional regulation current can be provided to the load R by the current regulation circuit 150 as described above.

Figure 5:
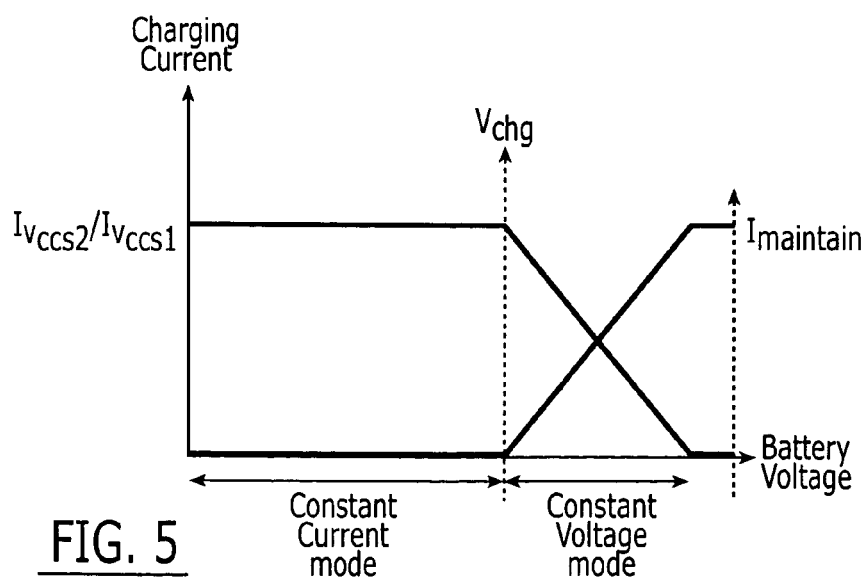
FIG. 5 is a graph illustrating constant current and constant voltage modes of operation according to some embodiments of the invention.

FIG. 5 is a graph that illustrates operations of the battery charger circuit in constant current mode and constant voltage mode according to some embodiments of the invention. In particular, in constant current mode, the current provided by the first current source 112 is held substantially constant until the voltage at the input of the battery 105 is determined to be at least equal to the predetermined threshold voltage $V_{CHG}$. At this point, the operation of the battery charger circuit switches to constant voltage mode, wherein the voltage maintenance circuit 140 provides the variable maintenance current to the load R. As the voltage at the battery input continues to increase, so does the amount of the variable maintenance current provided to the load R. As the variable maintenance current provided by the voltage maintenance circuit 140 increases, the currents ($I_{VCCS1}/I_{VCCS2}$) provided by the first and second current sources 112, and 110 are reduced to maintain a constant voltage at the input of the battery.

Figure 6:
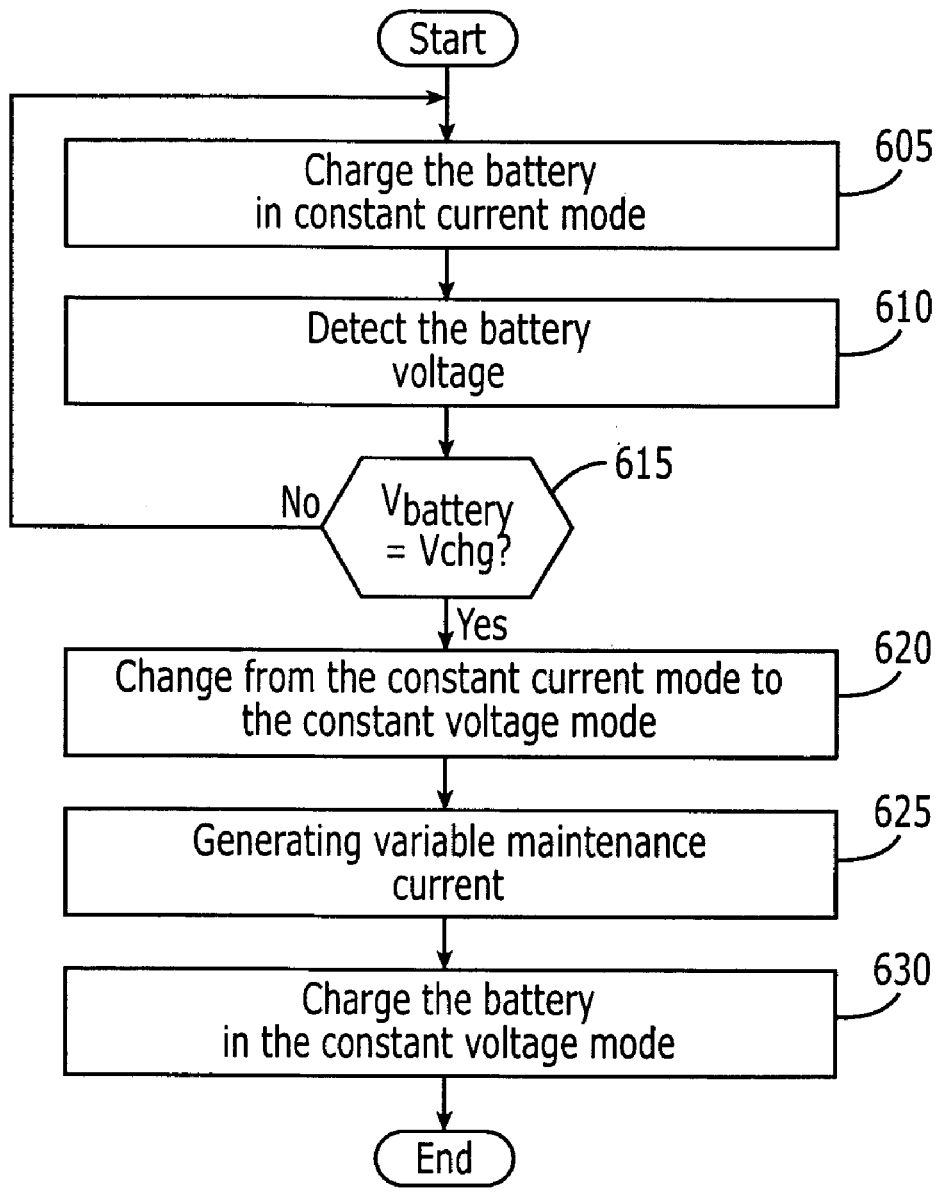
FIG. 6 is a flow chart that illustrates operations of battery charging circuits according to some embodiments of the invention.

FIG. 6 is a flowchart that illustrates operations of a battery charger circuit according to some embodiments of the invention. The battery charger circuit begins operation by charging the battery in constant current mode (Block 605). The voltage level detector stage of the voltage maintenance circuit 140 monitors the voltage at the input of the battery (Block 610). If the voltage at the input of the battery is determined to be less than the predetermined threshold voltage $V_{CHG}$ (Block 615), the battery charger circuit continues to operate in constant current mode and monitor the voltage at the input of the battery.

If, however, the voltage at the input of the battery is determined to become about equal to the predetermined threshold voltage $V_{CHG}$ (Block 615), the battery charger circuit ceases operations in constant current mode and begins operating in constant voltage mode (Block 620). In constant voltage mode, the voltage maintenance circuit 140 generates a variable maintenance current which is provided to the load R along with the current generated by the first voltage controlled current source.

As described above, as the variable maintenance current increases, the currents provided by the first and second voltage controlled current sources 112, 110 are reduced (Block 625). In particular, as the variable maintenance current is introduced into the load R, the current $I_{VCCS1}$ provided by the first voltage controlled current source 112 is reduced (which also causes the current $I_{VCCS2}$ provided by the second voltage controlled current source 112 to be reduced) so that in the constant voltage mode, the battery charger circuit varies the current provided by the first and second current sources to provide a varying current to the battery and a constant voltage at the input thereto in the constant voltage mode (Block 630).

Many alterations and modifications may be made by those having ordinary skill in the art, given the benefit of present disclosure, without departing from the spirit and scope of the invention. Therefore, it must be understood that the illustrated embodiments have been set forth only for the purposes of example, and that it should not be taken as limiting the invention as defined by the following claims. The following claims are, therefore, to be read to include not only the combination of elements which are literally set forth but all equivalent elements for performing substantially the same function in substantially the same way to obtain substantially the same result. The claims are thus to be understood to include what is specifically illustrated and described above, what is conceptually equivalent, and also what incorporates the essential idea of the invention.

What is claimed:

1. A circuit for charging a battery comprising:
    a voltage controlled current source including first and second current sources connected in a mirror configuration to provide a first current output to a load and a second current output, mirroring the first current output, to a battery; and
    a voltage maintenance circuit coupled to the battery and configured to compare a voltage at the battery to a predetermined threshold voltage and configured to generate a variable maintenance current, that increases as the voltage at the battery increases beyond the predetermined threshold voltage, to be combined with the first current output, thereby causing the first and second current outputs from the voltage controlled current source to be reduced as the variable maintenance current increases.

* * * * *